United States Patent [19]

Stager

[11] Patent Number: 5,574,944
[45] Date of Patent: Nov. 12, 1996

[54] SYSTEM FOR ACCESSING DISTRIBUTED MEMORY BY BREAKING EACH ACCEPTED ACCESS REQUEST INTO SERIES OF INSTRUCTIONS BY USING SETS OF PARAMETERS DEFINED AS LOGICAL CHANNEL CONTEXT

[75] Inventor: Gary B. Stager, Plano, Tex.

[73] Assignee: Convex Computer Corporation, Richardson, Tex.

[21] Appl. No.: 168,067

[22] Filed: Dec. 15, 1993

[51] Int. Cl.$^6$ .................................................. G06F 15/40
[52] U.S. Cl. ...................... 395/825; 395/480; 364/228.1; 364/251.7; 364/254.2; 364/DIG. 1
[58] Field of Search ................................. 395/275, 425, 395/800, 825, 480

[56] References Cited

U.S. PATENT DOCUMENTS

| | | | |
|---|---|---|---|
| 4,484,262 | 11/1984 | Sullivan | 395/421.06 |
| 4,774,659 | 9/1988 | Smith et al. | 395/418 |
| 4,814,979 | 3/1989 | Neches | 395/650 |
| 4,847,830 | 7/1989 | Momirov | 370/58.1 |
| 5,007,053 | 4/1991 | Iyer et al. | 371/21.1 |
| 5,111,389 | 5/1992 | McAuliffe et al. | 395/800 |
| 5,117,350 | 5/1992 | Parrish et al. | 395/401 |
| 5,276,826 | 1/1994 | Rau et al. | 395/405 |
| 5,379,385 | 1/1995 | Shomler | 395/421.01 |
| 5,428,758 | 6/1995 | Salsburg | 395/492 |
| 5,469,566 | 11/1995 | Hohenstein | 395/182.04 |

OTHER PUBLICATIONS

*Design of the Standord DASH Multiprocessor*, Daniel Lenoski et al, Computer Systems Laboratory, Stanford University, Dec. 1989.

*The Directory–Based Cache Coherence Protocol for the DASH Microprocessor*, Daniel Lenoski, et al, Computer Systems Laboratory, Stanford University, Dec. 1989.

*Memory Consistency and Event Ordering in Scalable Shared–Memory Multiprocessors*, Kourosh Gharachorloo, Computer Systems Library, Stanford University, Mar. 1990.

*The Design and Analysis of DASH: A Scalable Directory–Based Multiprocessor*, Daniel Lenoski, Dec. 1991.

*Primary Examiner*—Thomas C. Lee
*Assistant Examiner*—Moustafa Mohamed Meky

[57] ABSTRACT

A distributed memory I/O interface 10 is provided which allows a plurality of standard peripheral bus I/O controllers 101 to perform multiple transfer operations simultaneously and independently within a networked, distributed memory system 102. The interface 10 includes a peripheral interface 11 to the I/O controllers 101, a memory interface 12 to the distributed memory system 102, a system interface 13 to the processors of the distributed memory system 102, a caching circular buffer RAM 12, and an internal bus 105. The operations of the interface 10 are controlled by logical channels. Each logical channel comprises a channel context, which includes a set of parameters stored in buffer RAM 12 that specify among other things logical address space, a physical memory map, a RAM buffer segment, and a set of allowed transactions for use during channel operations. Data is staged through RAM segments which act as circular buffer caches within the channel's logical address space for sequential transfers, and as doubly-mapped shared memory for random access. The use of an intermediate logically contiguous address space and a caching circular buffer, and the methods by which the parameters in the logical channel context are referenced and modified by the components of the interface 10 allows for multiple I/O transfer operations to be active simultaneously and executed independently.

9 Claims, 8 Drawing Sheets

SYSTEM FOR ACCESSING DISTRIBUTED MEMORY BY BREAKING EACH ACCEPTED ACCESS REQUEST INTO SERIES OF INSTRUCTIONS BY USING SETS OF PARAMETERS DEFINED AS LOGICAL CHANNEL CONTEXT

TECHNICAL FIELD OF THE INVENTION

This invention relates to system and methods for accessing computer memory and more particularly to such system and methods used in distributed memory.

BACKGROUND OF THE INVENTION

Historically, peripheral devices such as input/output (I/O) storage devices and computer networks were connected to the associated computer through a host interface proprietary to that computer. The peripheral devices themselves were standard, each computer model had its own physical connection and data flow protocol to each interface with a peripheral device. Over time, open systems have evolved and standardization has occurred as usage has increased at the workstation and PC levels such that standardized interfaces to the peripherals have become more common.

Over time, the point of interface has changed from being located at the host computer devices themselves to being located in standardized controllers interposed between the devices and the computer. These controllers use a relatively standard interface into the computer system. The forms of standardized bus now integrated into a computer are typically the VME bus, the EISA bus, the NuBus, and the SBus, among others. Such standardized buses work well within a conventional computer architecture in which all processors, memory, and I/O controllers either reside on a common bus, or several tightly coupled busses. In these systems, data accesses are performed as simple indivisible operations which complete relatively quickly within predictable time limits. This type of access is referred to as low latency deterministic access.

The current state of the art is evolving toward parallel distributed systems. These systems are modular and are loosely coupled, so that the processing modules can be geographically separated. Architecturally, these systems are not as tightly coupled and bound as the traditional work station where a bus, a memory, and other components are tied together at a single point. The interconnection between elements of a distributed system is instead more closely associated with a network paradigm than with a bus paradigm.

A network paradigm is characterized by long, indeterminate access latencies, out-of-order completion, and split transactions, wherein a request is sent to multiple memory nodes and some time later a complete response appears. A network configuration does not tie up the system resources for the duration of the access. This differs from a traditional bus paradigm wherein the system sends an address, and waits to get the data transfer to complete the operation. As systems become less bound together, bus architectures become less desirable.

A technological advantage could be gained, both from a performance standpoint and an availability of resources standpoint, by using the existing product base of standardized I/O bus controllers in a network-type distributed memory system. A substantial problem occurs because the standard I/O bus controllers and network type distributed memory systems typically incorporate different memory access protocols. In particular, the I/O controller is a device used in systems that very likely expect and require a low latency "atomic" access, in which an address is sent, and data is received in one indivisible operation, while parallel systems utilize distributed memory arranged with network-type interconnections and characterized by out-of-order completions.

Thus, one problem in the prior art which should be resolved is to incorporate existing standard (bus protocol) I/O controllers, device controllers, or interface controllers into parallel architecture systems.

Another problem is to utilize such bus type devices in a system having long latencies and out-of-order completions.

SUMMARY OF THE INVENTION

The foregoing problems and other problems have been solved by a structure which uses multiple intermediate logical address bases in what is referred to as a "logical channel". A logical channel consists of a logically contiguous address space, a transaction set that is allowed within that channel, and an associated buffer. The logical channel allows for the emulation of a bus-type interface to the controller and translates the bus-type memory transfers into a network protocol which is required to access system memory.

Three logical elements within the logical channel must be manipulated and coordinated. These three elements are: the Peripheral Interface, which is the bus oriented I/O interface; the Memory Interface, which is the system that executes the network-like direct memory access operations to the distributed memory system; and the System Interface, which is the system by which the CPU and the system software intervene to configure, control, and collect the status of channel operations.

The logical channel is in essence a logical construct that is defined by a context associated with that channel. The context defines a current logical address for the Memory Interface, a current logical address for the Peripheral Interface, some configuration parameters that define the buffer segment, the Memory Interface status, the Peripheral Interface status, and pointers to and entries from an address translation table. The address translation is a function that allows mapping of a distributed memory comprised of memory blocks having discontiguous physical addresses into a single, contiguous logical address space. The buffer segment is used to stage data as it is being transferred from external devices into the distributed memory and vice versa, depending on whether it is an input or an output channel.

Staging transfer data in an intermediate buffer allows bus oriented data accesses to be decoupled from the high-latency distributed-memory network interconnections. The peripheral interface accesses the buffer in response to transfer requests from peripheral bus-based I/O controllers, and the memory interface performs read-ahead or write-back transfers between the buffer and main memory according to the amount of valid data or available space within the buffer.

The channel buffers are implemented using standard semiconductor random access memory (RAM) which is accessible from the peripheral interface, memory interface, and system interface. Each logical channel context specifies an offset and a size within the total buffer RAM which defines the buffer segment for that particular channel. Each channel buffer segment functions as a cache which is referenced (i.e. indexed) using the channel logical address space. The buffer segments differ from conventional caches in that they do not have a fixed "line size" and are not statically mapped to a block (or blocks) of main system memory. Rather, a channel buffer segment operates as a circular buffer with the Memory Interface Logical Address Register and Peripheral Interface Logical Address Register acting as head and tail pointers within the segment to specify the location and amount of the data currently encached. As data transfers proceed, the buffer segment cascades through the channel's logical address space, functioning as a "sliding" cache block. In this manner, a single buffer segment, regardless of its size, may encache the entire channel's logical address range without invalidates or remapping. The buffer segment configuration parameters and the current logical addresses are stored in the channel context (i.e. channel state table).

The use of an intermediate logical contiguous address space, and a caching circular buffer are the key features which allow standard peripheral bus controllers to function within a networked, distributed memory environment. The concept of the logical channel context and the method(s) by which its parameters are referenced and modified by the present invention allows multiple I/O transfer operations to be active simultaneously and execute independently, which greatly enhances system performance and flexibility.

One example of the problems involved in using standard peripheral I/O controllers within a network-type distributed memory system occurs when the memory resident buffer space for a large data set which is being transferred into or out of the memory system is fragmented and entered across different nodes in the distributed memory system. It is inefficient and sometimes impossible for a traditional system controller to manage the transfer to such a fragmented buffer space. This "scatter-gather" problem requires high "overhead" information on the part of the controller. The traditional way to handle this problem is with a one-to-one mapping of segments of one address space directly to corresponding segments of the physical address space.

It is thus one technical advantage of the invention to provide a computer structure and method for allowing for the use of a large contiguous address space rather than fragmented windows when handling large data sets which are positioned across different system nodes.

It is another technical advantage of the invention to utilize a cascading cache controlled by logical channels when multiple channels may be active at the same time.

It is a still further technical advantage of the invention to store in memory a plurality of different contexts and when a logical channel becomes active the context associated with that channel at that time is loaded into hardware for control purposes.

The foregoing has outlined rather broadly the features and technical advantages of the present invention in order that the detailed description of the invention that follows may be better understood. Additional features and advantages of the invention will be described hereinafter which form the subject matter of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
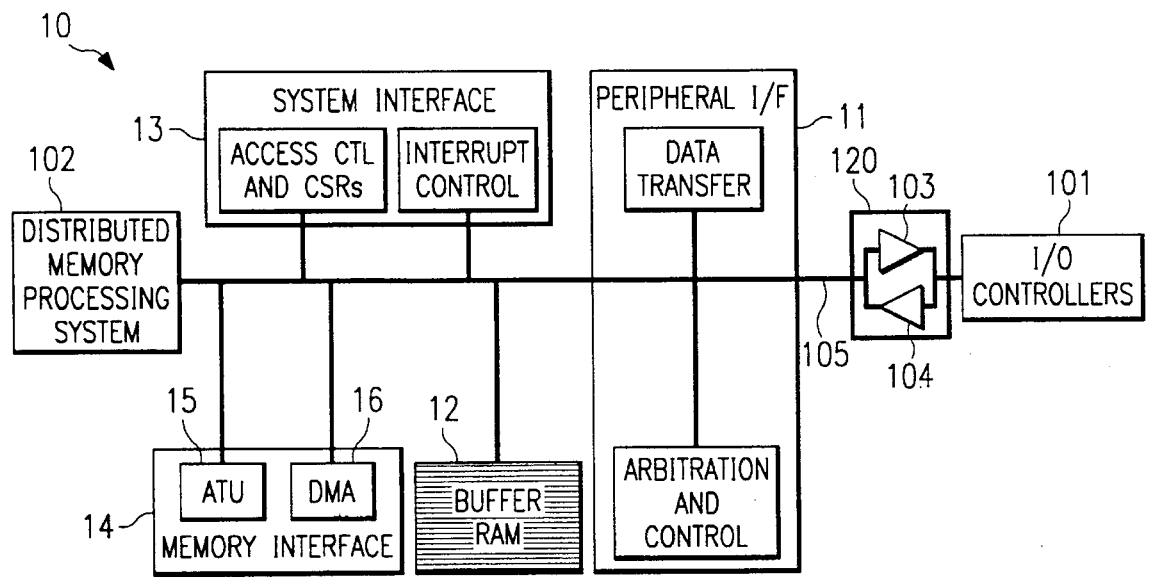
FIG. 1 is a functional block diagram of the present invention.

Turning now to FIG. 1, there is shown an interface 10 that conceptually illustrates the functional partitioning of a device architecture according to the present invention. For a more complete description of distributed memory processing system 102 reference is now made to "Exemplar Architecture," Convex Part No. 081-023430-000, available from Convex Computer Corporation, 3000 Waterview Parkway, Richardson, Tex. 75080, such document describing the best mode of operation of distributed memory processing system 102 and is hereby incorporated herein by reference. Interface device 10 includes memory interface 14, system interface 13, and peripheral interface 11 which are independent and autonomous control units, or logical elements, that cooperate to transfer data between I/O controllers 101 and distributed memory processing system (DMPS) 102.

There is an isolation point 120 between I/O controllers 101 and the interface device 10. The isolation point 120 isolates the functions of the I/O controller bus from internal bus 105 of the interface device 10. The three functional elements, system interface (SIF) 13, peripheral interface (PIF) 11, and memory interface (MIF) 14 are configured and controlled by a logical construct called the logical channel context or logical channel state, discussed further below. All the transfer and control operations executed by the preferred embodiment of the present invention function within the context of the logical channel. Further, in the preferred embodiment, multiple logical channels can be defined and active at any given time.

Buffer RAM 12 functions as a segmented data buffer for staging data that is sent through the interface device 10. Part of the context of a logical channel defines a segment of buffer RAM 12 to be used as a channel buffer. The channel buffer functions as a read-ahead, write-back circular buffer, and the actual physical buffer RAM 12 locations are decoded from the logical addresses that are currently being used by PIF 11 and MIF 14. As data flows through these buffers, as will be seen, the actual area of physical memory that is encached by that buffer moves as the logical addresses of the functional elements proceed through the data transfer stage.

An important point to note is that there is a single point of reference for the context of the channel. This point of reference, in the preferred embodiment, resides in buffer RAM 12, but architecturally it could reside in any readily accessible RAM. As operations are required to support peripheral transfers that are serviced by peripheral interface 11 or when a direct memory access (DMA) access to system memory 102 is initiated by memory interface 14, the control structures for a given channel in the channel context are "checked out" from a copy of the context table in buffer RAM 12, loaded on to execution units within the circuit, and manipulated during the course of the data transfer.

Updated status is also recorded in the channel context, and then, at a break point, which can be completion of the total operation or a scheduled break point, the interfacing device 10 swaps out the context of the first channel and swaps in the context of a second channel. At that point, those modified parameters in the first channel context are checked back into the copy that is resident in buffer RAM 12. Thus, for any given parameter of the channel context, only one of the three functional elements, SIF 13, PIF 11, or MIF 14, is allowed to modify a given parameter in the channel context; however, all three of them routinely will read and interpret all of the parameters. The parameters of the channel context, shown in FIGS. 3A through 3J, will be discussed in greater detail below. Restricting which functional elements can modify a given parameter in the channel context is important because coherency is maintained in the operation of the channel by allowing a functional element to modify only those parameters that pertain to that functional element. For example, during normal operations, only the MIF 14 will modify the Memory I/F Status Register in a channel context.

Figure 2:
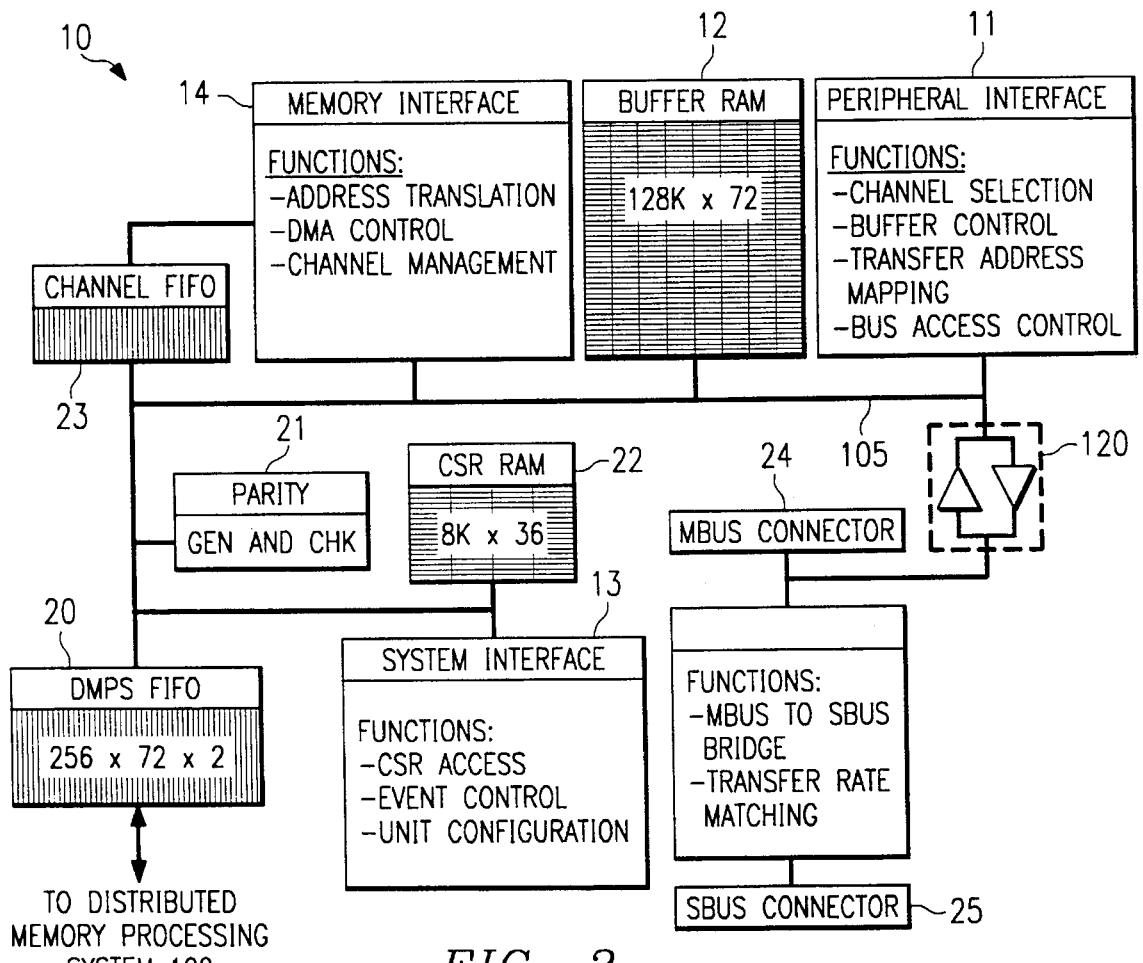
FIG. 2 is a functional block diagram providing greater detail of the block diagram depicted in FIG. 1.

FIG. 2 is a more detailed version of FIG. 1 showing a functional overview diagram of the various elements of FIG. 1 and how they perform in the preferred embodiment of the present invention.

Memory interface 14 is responsible for address translation, DMA control and channel management. As will be discussed below, address translation is the changing of an address from channel logical address to a distributed memory physical address. DMA control is the transferring of data between buffer RAM 12 and the memory of the distributed memory processing system (DMPS) 102. Channel management is the scheduling of channels.

Peripheral interface 11 is responsible for channel selection which entails the mapping via address decoding of an address supplied by a peripheral I/O controller 101 to a specific logical channel. PIF 11 selects a logical channel based on the most significant bits of the address supplied by the bus-based peripheral I/O controller 101. PIF 11 is also responsible for controlling access to the global resources of the present invention, namely, buffer RAM 12 and internal bus 105 that interconnects the other units.

System interface 13 is responsible for control of the Command and Status Register (CSR) access, which allows the CPUs of the distributed memory processing system 102 to access the internal structures of interface device 10 and also serves as control for the system CPUs as they map through the interface device 10 into the address space of the peripheral I/O controllers 101, including their internal command and status registers. SIF 13 also is responsible for event control, which is primarily an interrupt structure to the CPUs of the distributed memory processing system (DMPS) 102. SIF 13 configures and controls the global aspects of the interface device 10 in that it sets, resets, and enables the functional elements of the interface device 10. CSR RAM 22 stores the command and status registers for the interface device 10 and the various memory maps that are used for accessing peripheral I/O controller addresses. The embodiment shown in FIG. 2 uses stand alone RAM tied to the internal bus 105 in a preferred embodiment. CSR RAM 22 could conceptually be inside the system interface circuit.

An internal bus 105 connects all the functional units of interface device 10. Parity is checked and/or generated as required for all bus transactions by a parity device 21. The inboard interface to distributed memory 102 is through DMPS FIFO 20 which functions as a rate matching and hysteresis buffer to the distributed memory processing system (DMPS) 102.

FIGS. 3A–3J are a series of diagrams illustrating the individual parameters of the channel context or channel state table according to one embodiment of the present invention. The table resides in a dedicated location in buffer RAM 12 known by default by all the functional elements within the present invention's hardware and the software of the distributed memory processing system (DMPS) 102. The location is a function of its channel number. A channel context is comprised of 128 bytes where 4 bytes form a word. The channels are arranged from 0 to N, the maximum number of channels and each channel is offset from the previous one by 128 bytes.

Figure 3A:
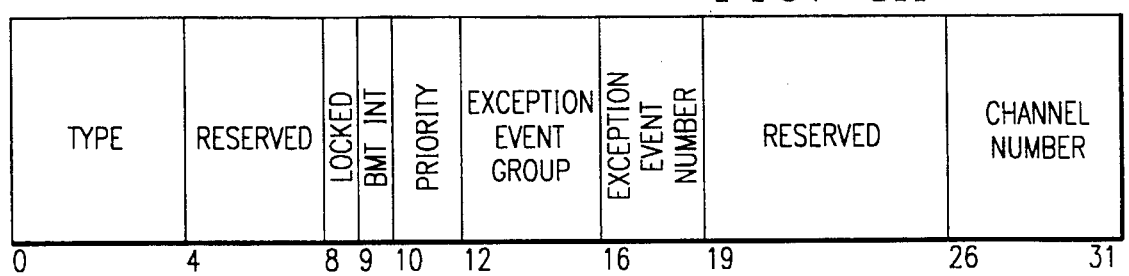
FIGS. 3A–3J are diagrams of individual words contained in a channel context table showing the subfields of the various words in the channel context.

The first word of the channel context is the Channel Configuration Register (CCR), shown in FIG. 3A. The Channel Configuration Register is used to enable and activate logical channels. CCR is written by the CPUs of the distributed memory processing system 102 and is referenced by the hardware of the interface device 10 to define and validate channel operations. CCR defines certain global parameters for the channel, such as the type of channel (i.e., a buffered input, buffered output, or a shared memory channel). Channel type is specified in bits 0–3 of CCR. Buffered input, buffered output and shared memory are the three primary channel types implemented in the preferred embodiment of the interface device 10. However, in alternate embodiments of the present invention, different values of bits 0–3 may be selected to implement other channels, such as interlocked input, interlocked output, and buffered random access, among others. There is a locking bit in the CCR which, when set by CPUs of the DMPS 102 through SIF 13, precludes or prevents operations on the channel by PIF 11 and MIF 14. The CCR also contains interrupt bits and priority bits which define a scheduling algorithm for that particular channel. The Channel Number is also part of the CCR. One of the effects of writing in the CCR is that it causes the channel to be scheduled. Therefore, when a channel is initialized, the MIF 14 will execute the channel. Data pre-fetches and accelerated address translations are initiated when that channel is initialized.

Figure 3B:
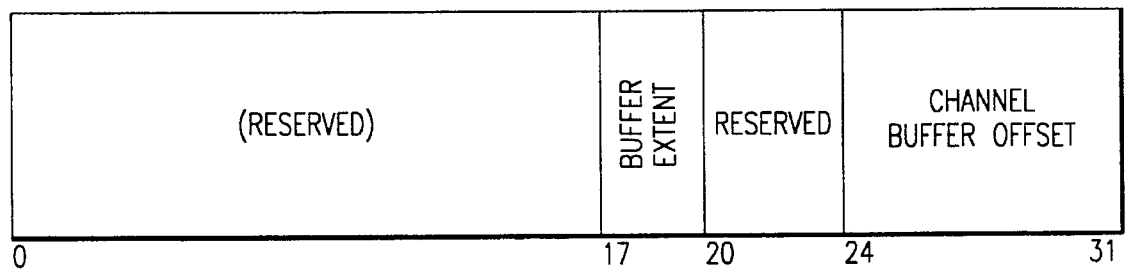

FIG. 3B shows the second word of the channel context, the Buffer Configuration Register, which is set by CPUs of the DMPS 102 when a channel is initialized. The Buffer Configuration Register (BCR) specifies the segment of the buffer RAM 12 assigned for use by a particular channel. The parameters in the BCR are Buffer Extent and Channel Buffer Offset. An architecturally defined parameter that is not shown in FIG. 3B is Buffer Block size. Many of the algorithms or functions used depend on block size, both in memory and in buffer management. The embodiment shown has a standardized block size of 4K bytes. The architecture can allow for a programmable block size by changing bits 20 through 23, marked "Reserved" in FIG. 3B, of the BCR.

Figure 3C:
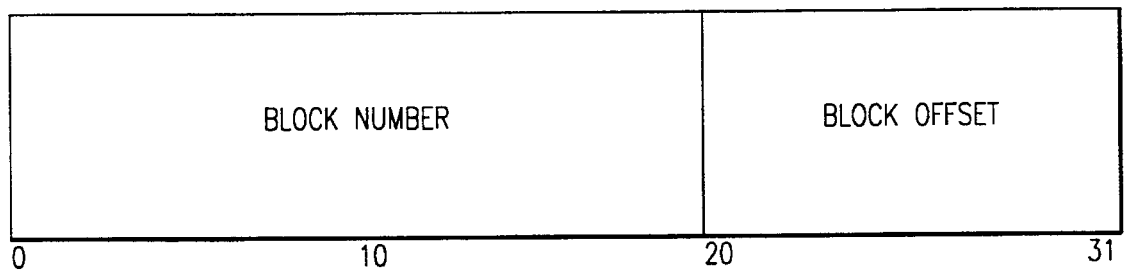

FIG. 3C shows the third word of the channel context, the Memory Interface I/F Logical Address Register, which is a pointer to the current (i.e., next sequential) logical address to be accessed by the DMA hardware 16. This value—in connection with the Peripheral Interface Logical Address Register—is used to control the buffer mapping between memory in the DMPS 102 and channel logical memory space, track valid data and available space within the buffer RAM 12. The Memory I/F Logical Address Register can be read or written by the CPUs of the DMPS 102 and is updated by MIF 14 hardware as transfers to and from the memory of the DMPS 12 by the DMA engine 16 are executed. This value is incremented by the transfer size and written back into the context block in RAM.

Figure 3D:
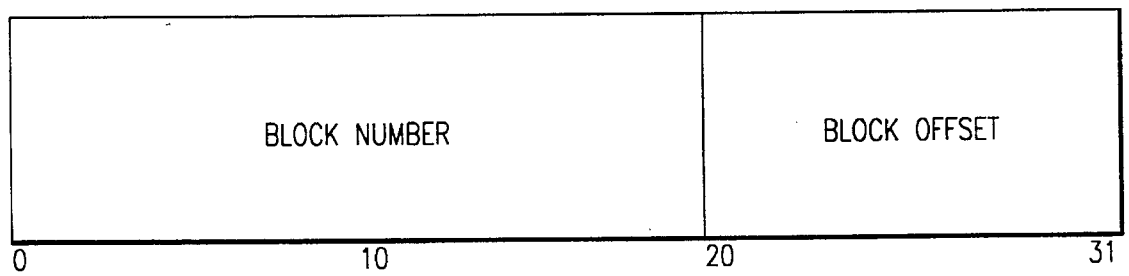

FIG. 3D shows the fourth word of the channel context, the Peripheral I/F Logical Address Register. The Peripheral Interface Logical Address is the current (i.e. next sequential) logical address to be accessed by the peripheral interface hardware 11. This value—in connection with the Memory Interface Logical Address Register—is used to control the buffer mapping between the channel logical memory space and peripheral memory space, track valid data and available space within the buffer RAM 12, and detect access discontinuities. The Peripheral Interface Logical Address may be read or written by the CPUs of the DMPS 102 and is updated by PIF hardware 11 as data transfers are executed by I/O controllers 101.

Figure 3E:
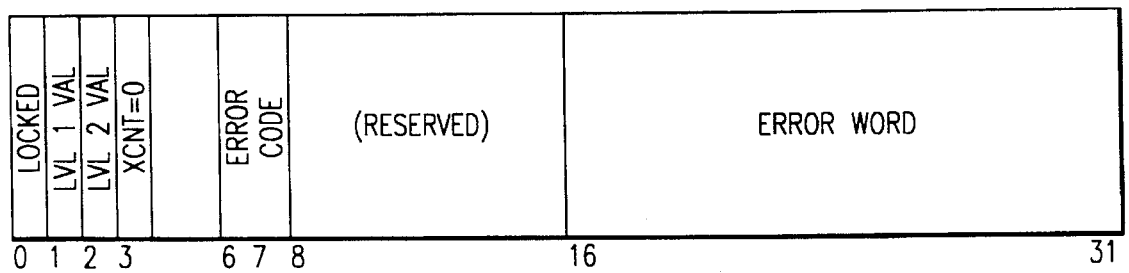

FIG. 3E shows the fifth word of the channel context, the Memory Interface Status Register, which reflects the current status of memory interface 14, which is comprised of the DMA engine 16 and address translation unit 15. It is interpreted and updated by the interface device 10 in order to manage and record the progress of data transfer operations. It is monitored by the CPUs of the DMPS 102 to obtain completion status and exception information. It may be written by the CPUs of the DMPS 102 through SIF 13, but in typical operations it is modified only by the MIF 14. Level 1 Valid and Level 2 Valid indicate whether or not the currently encached Level 1 and Level 2 BTE (or Block Table Entries) in the channel context are valid.

Figure 3F:
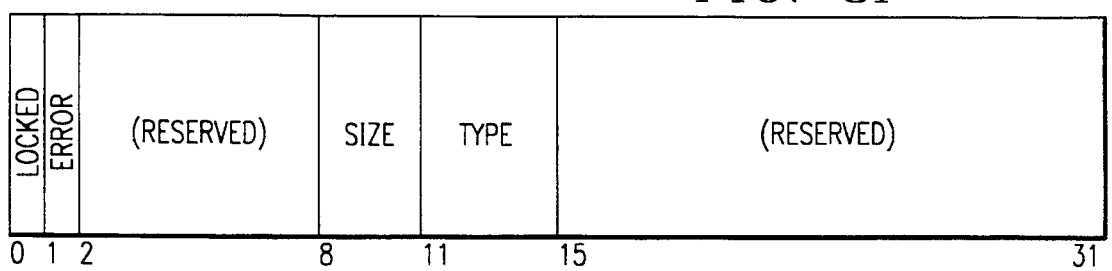

FIG. 3F shows the sixth word of the channel context, the Peripheral Interface Status Register, which is the corresponding status register for the peripheral interface 11. The Peripheral Interface Status Register reflects the current state of the peripheral interface hardware 11. It is interpreted and updated by interface device 10 in order to manage and record the progress of data transfer operations. It is monitored by the CPUs of the DMPS 102 to obtain completion status and exception information. The Peripheral Interface Status Register may be modified by the CPUs of the DMPS 102 through the SIF 13, but in typical operations it is modified only by the PIF 11.

Figure 3G:
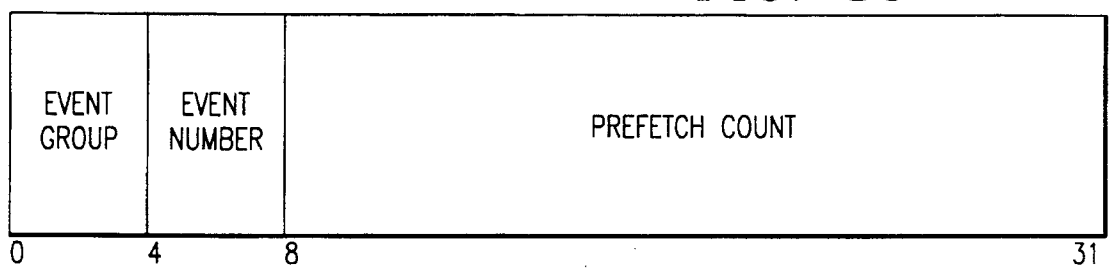

FIG. 3G shows the seventh word of the channel context, the DMA Control Register, which contains a Prefetch Count and a DMA Event designation. Part of the requirements imposed on the interface device 10 is that low latency access be provided to the bus-based I/O controllers 101. In order to do that, the MIF DMA engine 16 will encache data from main memory in the DMPS 102 in the channel buffer segment in buffer RAM 12 for output channels in anticipation of reads by the peripheral I/O controllers 101. Prefetch Count specifies a limit to the total amount of data to be read from DMPS 102 during the channel operation. This improves device efficiency by eliminating unnecessary data transfers and prevents the DMA engine 16 from reading DMPS 102 beyond the data designated for transfer, which could cause an error by reading memory that is not there, or a security violation by reading from memory locations that are not allowed to be accessed by the DMPS 102. The DMA Event designation selects which system interrupt (if any) is to be asserted when Prefetch Count reaches zero.

Figure 3H:
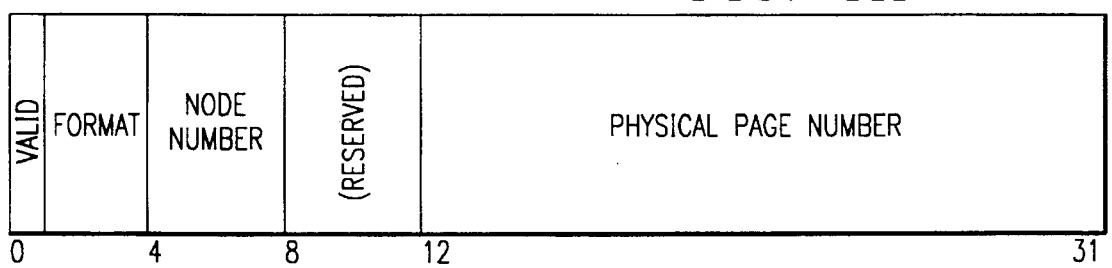

FIG. 3H shows the eighth word of the channel context, the Buffer Table Base Pointer. This register contains the physical address of the base of the data structure accessed by the MIF hardware 14 in connection with logical to physical address translation. The translation tree is assumed to begin at a 4 kB boundary although the actual location of valid entries is determined by an index field in the logical address. This register is loaded by the CPUs of the DMPS 102. It may be read or written at any time and is not modified by the hardware of the interface device 10.

Figure 3I:
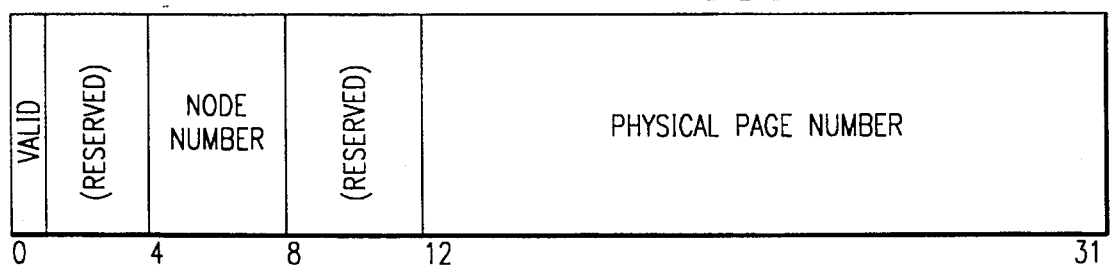
Figure 3J:
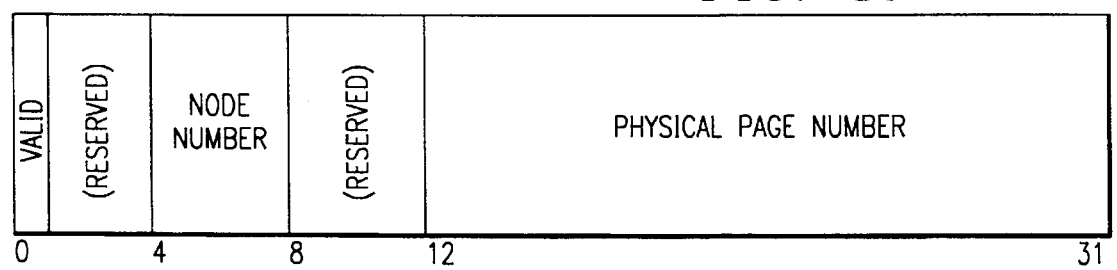

The remainder of the channel context or channel state table consists of four Level 1 Buffer Table entries, one of which is shown in FIG. 3I, and sixteen Level 2 Buffer Table Entries, one of which is shown in FIG. 3J. They are identical in format to the Buffer Table Base Pointer and are used in conjunction with the Memory Interface Logical Address Register by the MIF DMA engine 16 to generate a physical address in the memory of the DMPS 102. In the case of Level 1, one field of the memory logical address is used to index to the Level 2 tables and selects a block of Level 2 entries which then is indexed by another field of the memory logical address to get the physical page number for use by the DMA engine 16 for a given memory logical address. This is traditional address translation.

To expand on the use of the Buffer Table Entries, there are four of the Level 1 entries encached within the channel context and 16 of the Level 2 entries encached within the channel context. Encached means that the hardware of the interface device 10 typically will use the Buffer Table Base Pointer, which is programmed by the CPUs of the DMPS 102 when the channel is initialized, to autonomously (meaning in hardware) go to any portion of the distributed memory that is pointed to by the Buffer Base Table Pointer, fetch the Level 1 Buffer Table Entry and use the Level 1 Buffer Table Entry in conjunction with the logical address to fetch the Level 2 Buffer Table Entries and hold them local in the channel context. When 64 kilobyte boundaries are crossed, which corresponds to the limit of the encached Level 2 entries, they will be invalidated and the interface device 10 will fetch another block of Level 2 Buffer Table Entries.

Figure 4:
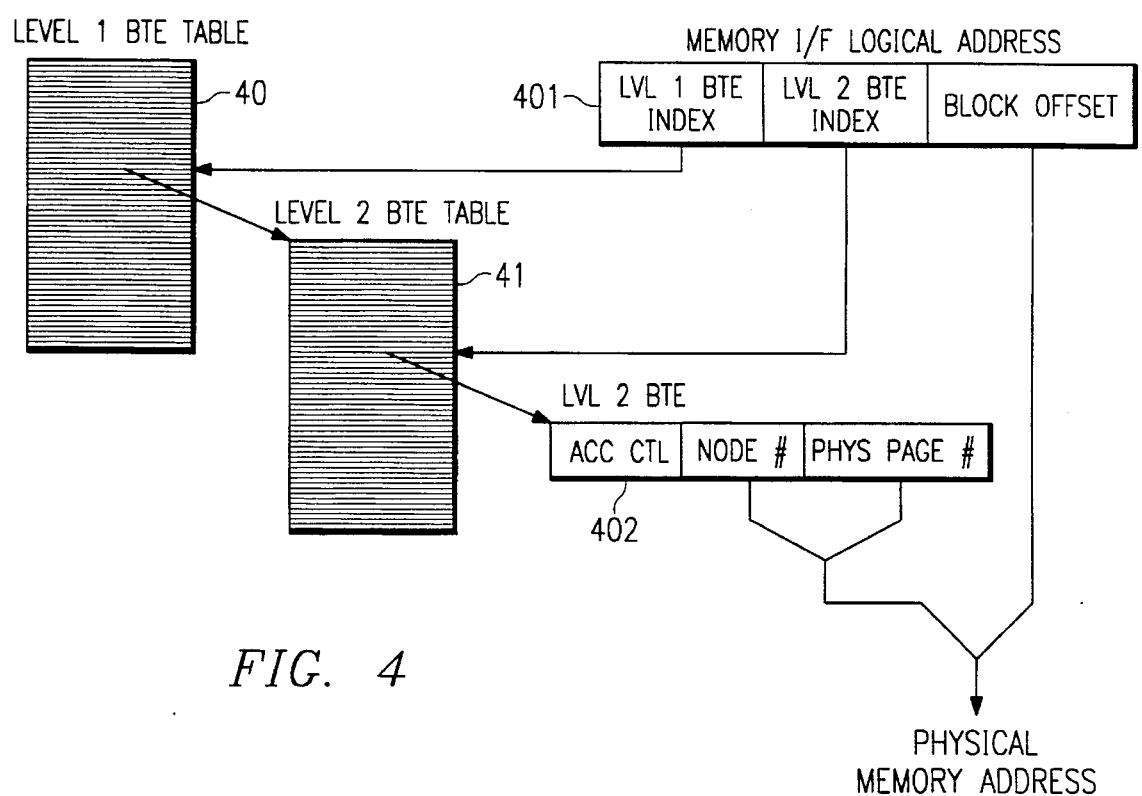
FIG. 4 is a functional diagram of the system memory addressing scheme of the present invention.

FIG. 4 is a pictorial representation of the use of the Level 1 and Level 2 Buffer Table Entries (BTE) by the MIF 14 as an address translation mechanism. Address 401 shows the Level 1 and Level 2 BTE Index fields and the Block Offset contained in the Memory I/F Logical Address. The two index fields are used to index into Level 1 BTE tables and Level 2 BTE tables. Address 402 shows the construction of the Level 2 BTE and how it is combined with Block Offset to derive a physical memory byte address in the memory space of the DMPS 102.

Figure 5:
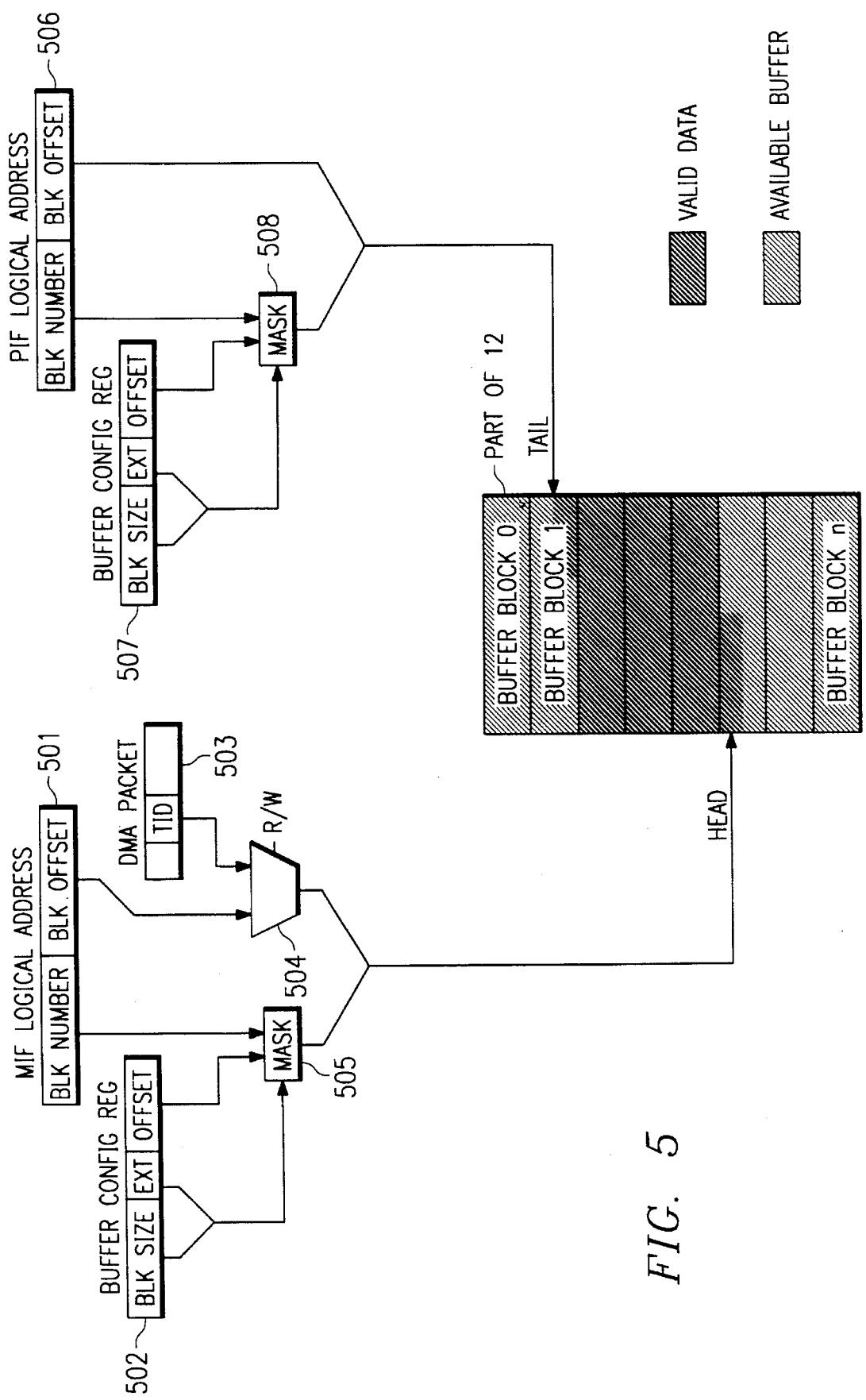
FIG. 5 is a functional diagram of the present invention functioning a buffered output channel.

FIGS. 5 through 8 show examples of the use of the buffered cache in buffer RAM 12 and how it is controlled using values of the logical addresses and the Buffer Configuration Register. FIG. 5 is an example of a logical channel that is configured as a buffered output channel, which means the data will be prefetched from the DMPS 102 by the MIF 14 using channel logic into the buffer segment in buffer RAM 12 so that the data will be available for low latency access by the peripheral bus I/O controllers 101. In this case the memory interface (MIF) logical address 501 passes through a selection mechanism that derives a buffer address based on the logical address and the buffer configuration values. The same is true of the peripheral interface (PIF) logical address 506. The pictorial representation of the buffer segment shows a segment of valid data with head and tail pointers from the memory interface 14 and the peripheral interface 11, respectively.

Figure 6:
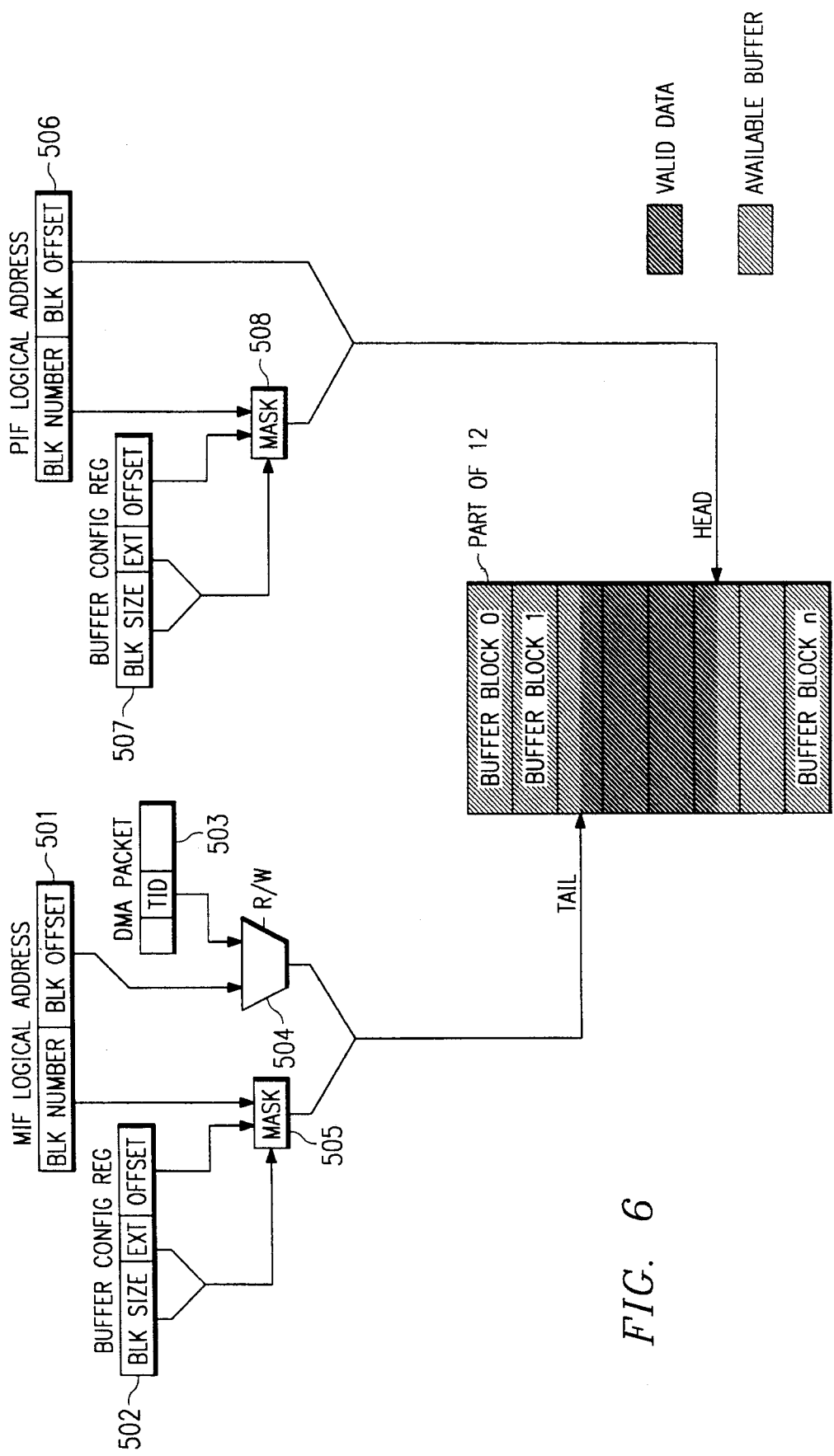
FIG. 6 is a functional diagram of the present invention functioning as a buffered input channel.

FIG. 6 depicts the same hardware configuration as FIG. 5 except that the elements function as a buffered input channel which is the converse of the buffered output channel in FIG. 5. The head and tails pointers in this case are reversed because the data is first placed in the buffer segment by the peripheral interface 11, which becomes the head pointer, and the data is read by the memory interface 12, which becomes the tail pointer as the DMA engine 16 performs a write-back of the buffered data to memory in the DMPS 102. In this manner, the tail pointer proceeds through memory "chasing" the head pointer.

Figure 7:
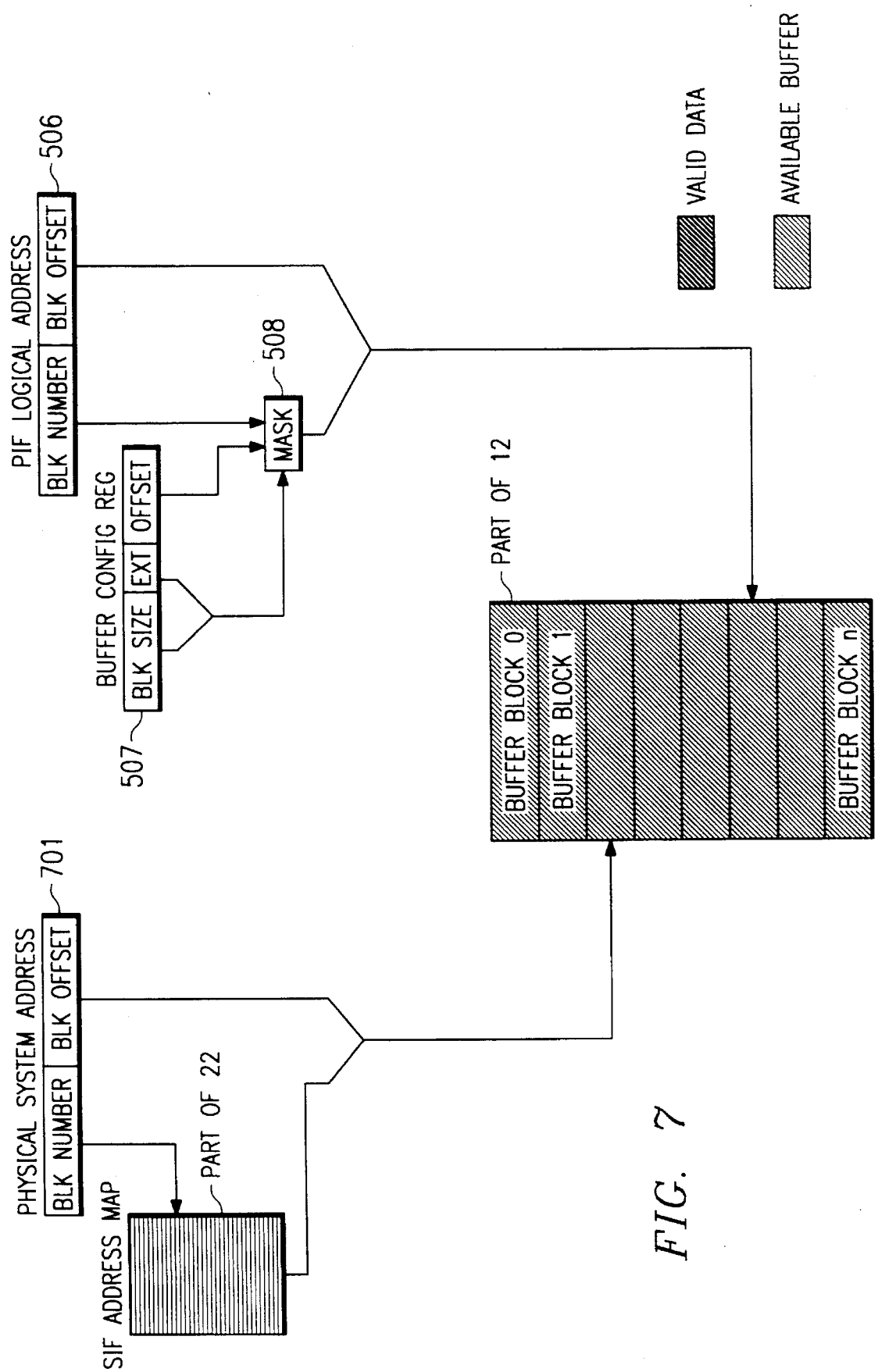
FIG. 7 is a functional diagram of the present invention functioning as a shared memory channel.

A third variant on logical channel configuration is the shared memory channel which is illustrated in FIG. 7. In this case, the two entities that are accessing the buffer RAM 12 are the peripheral interface 11 and the system interface 13, which responds to accesses initiated by the CPUs of the DMPS 102. In this mode of operation, the buffer doesn't sequentially read ahead or write back buffered data in the buffer RAM 12. Instead, it defines a statically mapped block of the buffer segment in which random access is allowed from both the system interface 13 and the peripheral interface 11. This represents the traditional shared memory or mapping that often is done between devices and different address spaces, such as a doubly mapped shared memory buffer.

Figure 8:
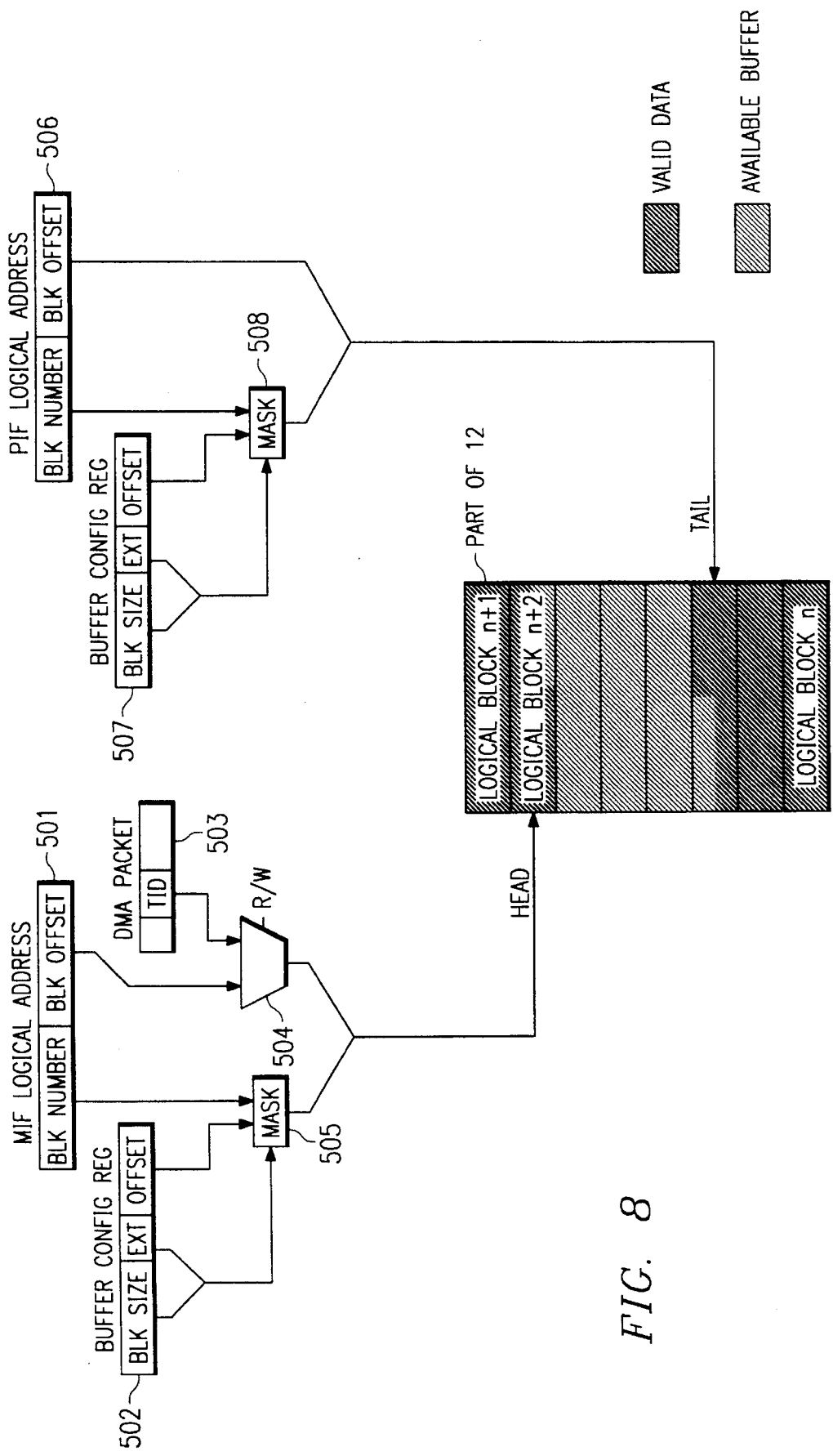
FIG. 8 is a functional diagram of the present invention addressing the buffer RAM space in a "cascading" access.

FIG. 8 is a modified representation of the output logical channel in FIG. 5. The difference is that FIG. 8 shows that the buffer is not fixed in terms of its position within the logical address space. FIG. 8 shows how the buffer can wrap around itself, functioning as a circular buffer as it logically moves, or cascades, through the logical address space. In FIG. 5–7, the blocks of the buffer segment are labeled Buffer Blocks 0 through N, which designate a physical block of the buffer RAM 12. In FIG. 8, the physical blocks of RAM are replaced with logical blocks, meaning blocks that correspond to blocks of logical address space. Again, the memory interface 14, since we are in a read-ahead situation, is supplying the head pointer in that it specifies the next location to be written into in the buffer, the peripheral interface 11 is supplying the tail pointer, which specifies the next location to be read from the buffer RAM 12. In this case, however, the disparity between the two pointers spans an address boundary that corresponds to the size of the buffer segment. Graphically, this spanning of an address boundary is indicated by the fact that logical block "N" is valid at the bottom of the physical buffer segment and logical block "N"+1 is also valid, but it wraps back around to the top of the buffer segment. The head and tail pointers are still logically consistent in that the tail pointer will proceed to the bottom as data is removed from the buffer block and then wrap around to the top as the head pointer proceeds from the top to the bottom of the block.

As mentioned previously, the present invention accesses the memory of the distributed memory processing system 102 by means of a split-transaction, request/response protocol. The memory address used for access requests is derived from the MIF logical address, which is subsequently incremented by the size of the transfer request. Multiple requests may be outstanding at any given time. In the read case, this presents a problem since the MIF logical address corresponds to the next request to be issued and not the buffer location to be used to store the data returned in the response. The problem is compounded by the fact that responses may return in a different order than the requests were issued (i.e., out-of-order completion).

The present invention solves this problem by using the Transaction ID (TID) field in DMA Packet 503, which is a unique identifier supplied with the request and returned with the corresponding response, as an index into the channel buffer segment in buffer RAM 12. When read data is received, the response TID is used as part of the buffer RAM address which—in connection with the MIF Logical Address Register and Buffer Configuration Register—allows the data to be stored in the proper location within the channel buffer (see FIG. 5). The current channel remains active in the MIF hardware 14 until all outstanding requests have completed, at which time the channel context is updated and a different channel context may be "checked out" by the MIF hardware 14 for execution. The maximum number of outstanding requests is determined by the TID size and the transfer packet size.

From an implementation standpoint, there are several factors that have to be considered in addition to what has been discussed.

Since the buffer head and tail pointers are derived from the current MIF and PIF logical addresses, and only a single set of these are preserved within the Channel State Table (i.e. channel context), the channel buffer segment in buffer RAM 12 for a DMA channel (i.e. a channel defined by the Channel Configuration Register as an input or output channel type as opposed to a shared memory channel) may contain a single contiguous block of data at any given time. This is sufficient for the vast majority of I/O operations, which can be executed as a series of contiguous block data transfers. However, the present invention must handle the case where, for whatever reason, a peripheral I/O controller 101 requests access to a logical address which is not the current PIF logical address recorded in the channel context. When this situation occurs, the peripheral bus transaction is suspended or aborted by the PIF hardware 11 and the logical channel is scheduled for execution by the MIF 14. The MIF hardware 14 will empty the buffer segment by either writing back currently buffered data, or invalidating data encached from DMPS 102 in buffer RAM 12. Once the segment is empty, the peripheral access can be resumed or retried. Peripheral access requests are also suspended or aborted, pending DMA execution, when a peripheral I/O controller 101 attempts to read an empty buffer segment or write to a full segment.

Channel DMA operations are scheduled for execution by writing the associated channel number into a channel FIFO queue 23. When a channel is dequeued for execution, its channel state table is loaded into the MIF hardware 14 and operations begin or continue from the point defined by the channel context. There are several conditions or events which cause logical channels to be scheduled for execution. When a channel is initialized, it is activated and scheduled when the Channel Configuration Register is written. This will typically cause the MIF 14 to fetch the initial BTE blocks required for address translation into the Channel State Table, and begin read-ahead transfers for output channels. If multiple channels are scheduled, the MIF hardware 14 will multiplex them by suspending execution of the current channel and requeuing it when a DMA block boundary is reached. The preferred embodiment of the present invention uses a 4096 byte DMA block size, but other sizes could be supported. Channel DMA is also scheduled by the PIF hardware 11 in response to peripheral I/O controller data transfers. One of several scheduling algorithms is employed by the PIF 11 depending on the value of the priority field of the Channel Configuration Register. For example, the priority field may tell the PIF 11 not to schedule a data transfer, to always schedule a data transfer following a peripheral access, to schedule a data transfer at DMA block boundaries, or to schedule a data transfer when the current PIF selected channel changes.

Shared memory channels do not perform DMA operations and are therefore not subject to the constraints described above regarding buffer pointer management. Shared memory channels allow random access to the channel buffer segments in buffer RAM 12 from the PIF 11 and the SIF 13. Shared memory channels are typically used to facilitate communication between the CPUs of the DMPS 102 and peripheral I/O controllers 101. Shared memory buffer segments contain statically mapped control and status structures or data. Compared to DMA, this provides a lower latency—but lower bandwidth—mechanism for passing information between I/O peripherals 101 and processors in the DMPS 102. The MIF 14 does not access the shared memory buffer segments.

Although the present invention and its advantages have been described in detail, it should be understood that various changes, substitutions and alterations can be made herein without departing from the spirit and scope of the invention as defined by the appended claims.

What is claimed is:

1. An apparatus for interfacing between a bus-based input/output device and a distributed memory processing system, wherein said system contains memory distributed over a plurality of nodes, wherein said bus-based I/O device issues access requests for data directed to a single memory location within a logical address space, and wherein said location may be spread over a plurality of said nodes, said apparatus comprising:

means for accepting said access requests from said I/O device to produce accepted access requests;

means for accessing said distributed memory in response to said accepted access requests;

a read/write buffer memory for storing said data and for storing one or more sets of parameters used to access said logical address space, wherein each said set of parameters is defined as a logical channel context, each set comprises a channel configuration parameter for enabling and activating a particular logical channel context and a buffer configuration parameter for specifying a segment of said read/write buffer assigned for use by said particular logical channel context; and circuitry controlled by said logical channel context for breaking each accepted access request into a series of instructions for accessing said memory spread over a plurality of said nodes.

2. The apparatus set forth in claim 1 and including an internal bus, wherein said means for accepting said access requests from said I/O device, said means for accessing said distributed memory, and said read/write buffer memory are coupled to said internal bus.

3. The apparatus set forth in claim 2 and including circuitry for checking and generating parity on said internal bus.

4. The apparatus set forth in claim 2 and including an internal read/write memory controlled by means for receiving instructions from one or more processors for storing information used to configure and manage said I/O device.

5. The apparatus set forth in claim 2 and including means for scheduling accesses to said distributed memory, wherein said scheduling means is controlled by said means for accessing said distributed memory.

6. The apparatus set forth in claim 2, wherein said scheduling means is a FIFO register.

7. The apparatus set forth in claim 4 and including means for scheduling accesses to said distributed memory, wherein said scheduling means is controlled by said means for accessing said distributed memory.

8. The apparatus set forth in claim 7, wherein said scheduling means is a FIFO register.

9. The apparatus set forth in claim 1, wherein said read/write buffer memory stores said one or more sets of parameters at a dedicated location within said buffer memory.

\* \* \* \* \*